United States Patent [19]
Yun et al.

[11] Patent Number: 6,134,401
[45] Date of Patent: Oct. 17, 2000

[54] PRINTER AND POWER CONTROLLING METHOD THEREFOR

[75] Inventors: Jin-su Yun; Yong-geun Kim, both of Suwon, Rep. of Korea

[73] Assignee: Samsung Electronics Co., Ltd., Kyungki-Do, Rep. of Korea

[21] Appl. No.: 09/362,676

[22] Filed: Jul. 29, 1999

[30] Foreign Application Priority Data

Jul. 31, 1998 [KR] Rep. of Korea ...................... 98-31169

[51] Int. Cl.⁷ ................................................ G03G 15/00
[52] U.S. Cl. ................................ 399/70; 399/37; 399/81; 399/88
[58] Field of Search ................................ 399/379, 43, 69, 399/70, 81, 82, 85, 88; 395/733, 750.01, 750.05

[56] References Cited

U.S. PATENT DOCUMENTS

| | | | |
|---|---|---|---|
| 5,457,516 | 10/1995 | Kim | 399/37 |
| 5,881,335 | 3/1999 | Yang | 399/70 |
| 5,946,526 | 8/1999 | Kim | 399/70 |

*Primary Examiner*—Sophia S. Chen
*Attorney, Agent, or Firm*—Sughrue, Mion, Zinn, Macpeak & Seas, PLLC

[57] ABSTRACT

A printer and a power controlling method therefor are disclosed. The disclosed printer has a print engine for printing a toner image on a sheet of paper; a power supply unit for supplying power; a power supply controller for supplying the print engine from the power supply unit with power corresponding to any one power mode selected from power modes of different power levels, including a ready-to-print mode in which the print engine is supplied with power so that the print engine can be ready for printing, a power saving mode in which the print engine is supplied with a level of power set below the level of power supplied to the print engine in the ready-to-print mode, and a power off mode in which power supply to the print engine is cut off; and a controller which controls the power mode setting of the print engine and the power supply controller so that an image corresponding to received print data can be printed on a sheet of paper. The controller controls the power supply controller so that when print data is not received from the outside for a first period of time in the ready-to-print mode, the ready-to-print mode is changed into the power saving mode, and controls the power supply controller so that when print data is not received from the outside for a second period of time in the power saving mode, the power saving mode is changed into the power off mode. With the printer and power controlling method for the printer, power consumption of the printer can be reduced when the printer in the on state is not used for a long time.

5 Claims, 4 Drawing Sheets

PRINTER AND POWER CONTROLLING METHOD THEREFOR

BACKGROUND OF THE INVENTION

1. Field of the Invention

The present invention relates to a printer and a power controlling method for the same, and more particularly, to a printer capable of reducing power consumption by gradually reducing power supply to the printer according to the duration for which the printer is not used, and a power controlling method for the same.

2. Description of the Related Art

In general, a printer has a controller for controlling the processing of received print data and the overall printer system, an input device which outputs a signal to the controller according to the operation of a function key, a print engine substantially charging a print job for printing on a sheet of paper while controlled by the controller, and a power supply unit for supplying electric power.

The print engine includes devices which must be heated at a constant temperature so as to enable a normal print job to be done, such as a transfer device for transferring and fixing a toner image formed on a photosensitive medium onto a sheet of paper. Therefore, in order to keep the print engine ready to do a print job, the transfer device must be continuously supplied with electric power required for heating the transfer device.

However, when the printer is not used for a long time while in the on state, such continuous supply of power causes unnecessary power consumption. Taking this fact into account, most printers employ a power saving mode so as to reduce power consumption when the printer is not used for a predetermined period of time. In the power saving mode, the power supply to a print engine is not completely shut off, and a level of power less than that required for doing a print job is supplied to the print engine. For example, the constant temperature of the transfer device is 100° C. in a ready-to-print mode in which a print job can be done, and the constant temperature of the transfer device can be maintained at 50° C. in a power saving mode.

However, since the printer still consumes power of several tens of watts even in the conventional power saving mode for saving power, power consumption may be large when the printer is not used for a long time while in the on state.

On the other hand, since the power mode of a conventional printer cannot be changed by a user, there is a disadvantage in that the power consumed when the printer is not used cannot be appropriately controlled.

SUMMARY OF THE INVENTION

To solve the above problems, it is an objective of the present invention to provide a printer which is capable of reducing power consumption while the printer is not used by gradually reducing supply power in proportion to the duration for which the printer is not used, and which has power modes which can be changed by a user, and a power controlling method for the printer.

Accordingly, to achieve the above objective, there is provided a printer comprising: a print engine for printing a toner image on a sheet of paper; a power supply unit for supplying power; a power supply controller for supplying the print engine from the power supply unit with power corresponding to any one power mode selected from power modes of different power levels comprising a ready-to-print mode in which the print engine is supplied with power so that the print engine can be ready for printing, a power saving mode in which the print engine is supplied with a level of power set below the level of power supplied to the print engine in the ready-to-print mode, and a power off mode in which power supply to the print engine is cut off; and a controller which controls the power mode setting of the print engine and the power supply controller so that an image corresponding to received print data can be printed on a sheet of paper, controls the power supply controller so that when print data is not received from the outside for a first period of time in the ready-to-print mode, the ready-to-print mode is changed into the power saving mode, and controls the power supply controller so that when print data is not received from the outside for a second period of time in the power saving mode, the power saving mode is changed into the power off mode.

It is preferable that the printer further comprises an input device in which a power mode set key is provided so that a user can select any one power mode from the ready-to-print mode, power saving mode and power off mode, and the controller controls the power supply controller so that the present mode can be changed into a power mode corresponding to a power mode selection signal supplied from the input device.

In addition, the controller controls the power supply controller so that the present mode can be changed into the ready-to-print mode when print data is received from the outside.

In addition, to achieve the above objective, there is provided a power controlling method for a printer which comprises a print engine for printing a toner image on a sheet of paper, a power supply unit for supplying power, a power supply controller for controlling the power supply from the power supply unit to the print engine, and a controller which controls the print engine and power supply controller so that an image corresponding to received print data can be printed on a sheet of paper, the method performed by the controller comprising the steps of: (a) initializing the print engine so that the print engine is ready for printing; (b) maintaining a ready-to-print mode in which the controller causes the power supply controller to supply the print engine with power so that the print engine is maintained in a state ready for printing after the above initializing step or after a waiting print job is completed; (c) changing the ready-to-print mode into a power saving mode in which the print engine is supplied with a level of power set below the level of power supplied to the print engine in the ready-to-print mode, when print data is not received from the outside for a first period of time in the ready-to-print mode; and (d) changing the power saving mode into a power off mode in which power supply to the print engine is cut off when print data is not received from the outside for a second period of time in the power saving mode.

BRIEF DESCRIPTION OF THE DRAWINGS

The above objective and advantages of the present invention will become more apparent by describing in detail preferred embodiments thereof with reference to the attached drawings in which.

DESCRIPTION OF THE PREFERRED EMBODIMENTS

Figure 1:
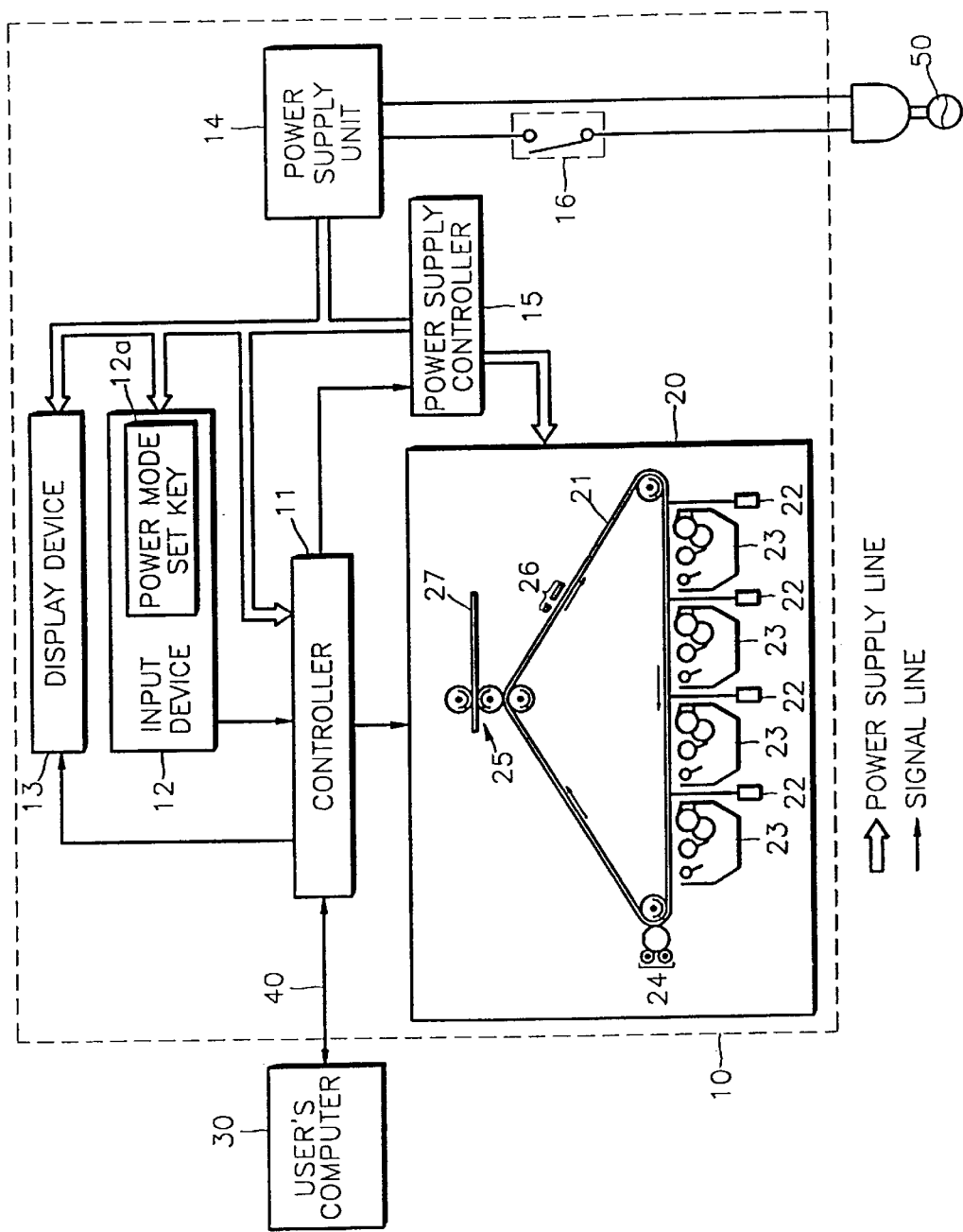
FIG. 1 is a block diagram illustrating a printer according to the present invention.

FIG. 1 is a block diagram illustrating a printer according to the present invention.

Referring to FIG. 1, a printer 10 connected to a user's computer 30 via a communication interface 40 includes a controller 11, an input device 12, a display device 13, a print engine 20, a power supply unit 14, and a power supply controller 15.

The controller 11 which controls the overall printer system converts print data input from the user's computer 30 into image data for the print engine 20 and outputs the image data to the print engine 20, and processes instructions input from the input device 12. In addition, the controller 11 controls the power supplied to the print engine 20 via the power supply controller 15, and displays the present power mode on the display device 13.

The print engine 20 performs a substantial part of a print job under the control of the controller 11. The print engine 20 for a liquid type laser color printer using colored inks as developers is shown in FIG. 1. The print engine 20 is provided with a plurality of optical scanning devices 22 for forming respective electrostatic latent images by scanning light beams on a circulating photosensitive belt 21, a plurality of developing devices 23 for developing the electrostatic latent images with corresponding colored inks, a drying device 24 for evaporating liquid carriers which remain on the photosensitive belt 21, a transfer device 25 for transferring the toner image formed on the photosensitive belt 21 onto a sheet of paper, and a reset device 26 for erasing the electrostatic latent images formed on the photosensitive belt 21 and initializing the photosensitive belt 21 so that new electrostatic latent images will be able to be formed on the photosensitive belt 21.

The power supply unit 14 is supplied with power from an external power source 50, for example, a commercial alternating current source, and produces voltages for various devices of the printer including the print engine 20. The power from the external power source 50 is selectively connected to or disconnected from the power supply unit 14 by operating the power switch 16.

The input device 12 installed on the outside of the main body may be provided with function keys for selectively performing various print functions, and outputs a signal corresponding to the operation of a selected key to the controller 11. The input device 12 may be provided with a power mode set key 12a for selecting any one power mode from a plurality of power modes. Therefore, a user can selectively switch from one mode to another by operating the power mode set key 12a, the plurality of modes including a ready-to-print mode in which power is supplied to the print engine 20 so that the print engine 20 is kept in a state capable of performing a print job, a power saving mode in which a level of power set appropriately below the level of power supplied to the print engine 20 in the ready-to-print mode is supplied to the print engine 20, and a power off mode in which power supply to the print engine 20 is cut off.

A method of generating a power mode selection signal by operating the power mode set key 12a can be embodied in various manners. For example, when the power mode set key 12a is a button operated by pressing the same, the circuit within the input device 12 can be configured so that a mode change from the present power mode to another is selected according to the duration of the on state by pressing the power mode set key 12a. That is, the circuit within the input device 12 can be configured so that when the power mode set key 12a is pressed for a time of, for example, 2 to 5 seconds in the ready-to-print mode, the input device 12 generates and outputs a power saving mode selection signal, and when the power mode set key 12a is pressed for a time longer than 5 seconds, the input device 12 generates and outputs the power off mode selection signal. Similarly, a mode change from the power saving mode or the power off mode to another one can be selected according to the duration of the on state by pressing the power mode set key 12a. Alternatively, the circuit within the input device 12 can be configured so that the present power mode can be changed according to a circular sequence of, for example, the ready-to-print mode, power saving mode, power off mode, and ready-to-print mode whenever the power mode set key 12a is pressed once.

The power supply controller 15 controls power supplied to the print engine 20 according to power mode selection signal. That is, when a ready-to-print mode setting signal from the controller 11 is input into the power supply controller 15, the power supply controller 15 causes power to be supplied to heaters installed in the transfer devices 25 and the drying device 24 so that the heaters can be heated to a temperature required for a print job and maintain the heated state, and the printer can perform a print job immediately. On the other hand, when a power saving mode setting signal from the controller 11 is input into the power supply controller 15, the power supply controller 15 causes power to be supplied to heaters installed in the transfer devices 25 and the drying device 24 so that the heaters can be heated to a temperature set below the temperature required for a print job and maintain the heated state.

When a power off mode setting signal from the controller 11 is input into the power supply controller 15, the power supply controller 15 cuts off the power supply from the power supply unit 14 to the print engine 20. In the power off mode, equipment other than the print engine 20, namely, the controller 11, display device 13, input device 12, and power supply controller 15 are continuously supplied with power from the power supply unit 14.

Figure 2A:
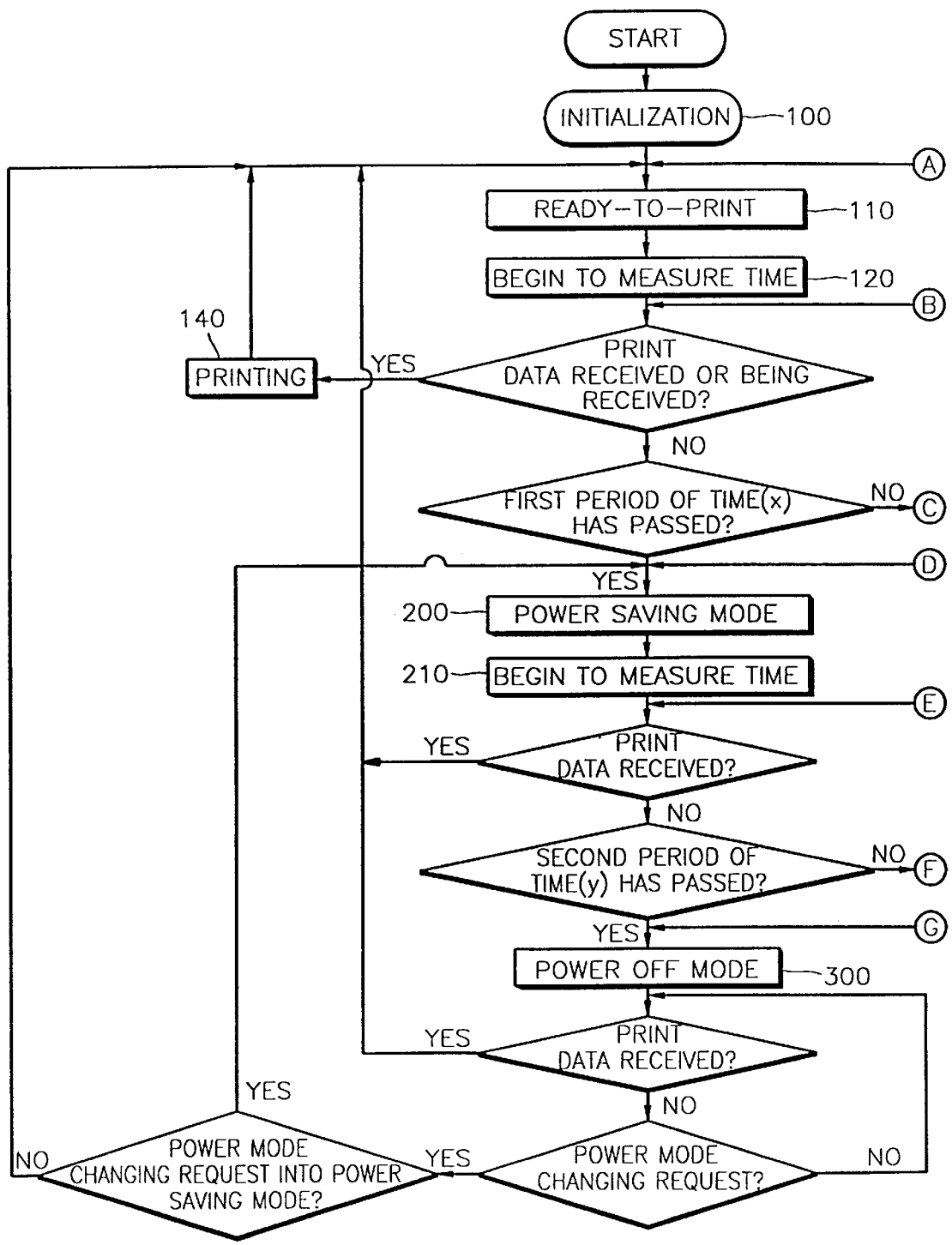
FIGS. 2(A) and 2(B) are flow charts illustrating power controlling steps according to the present invention.
Figure 2B:
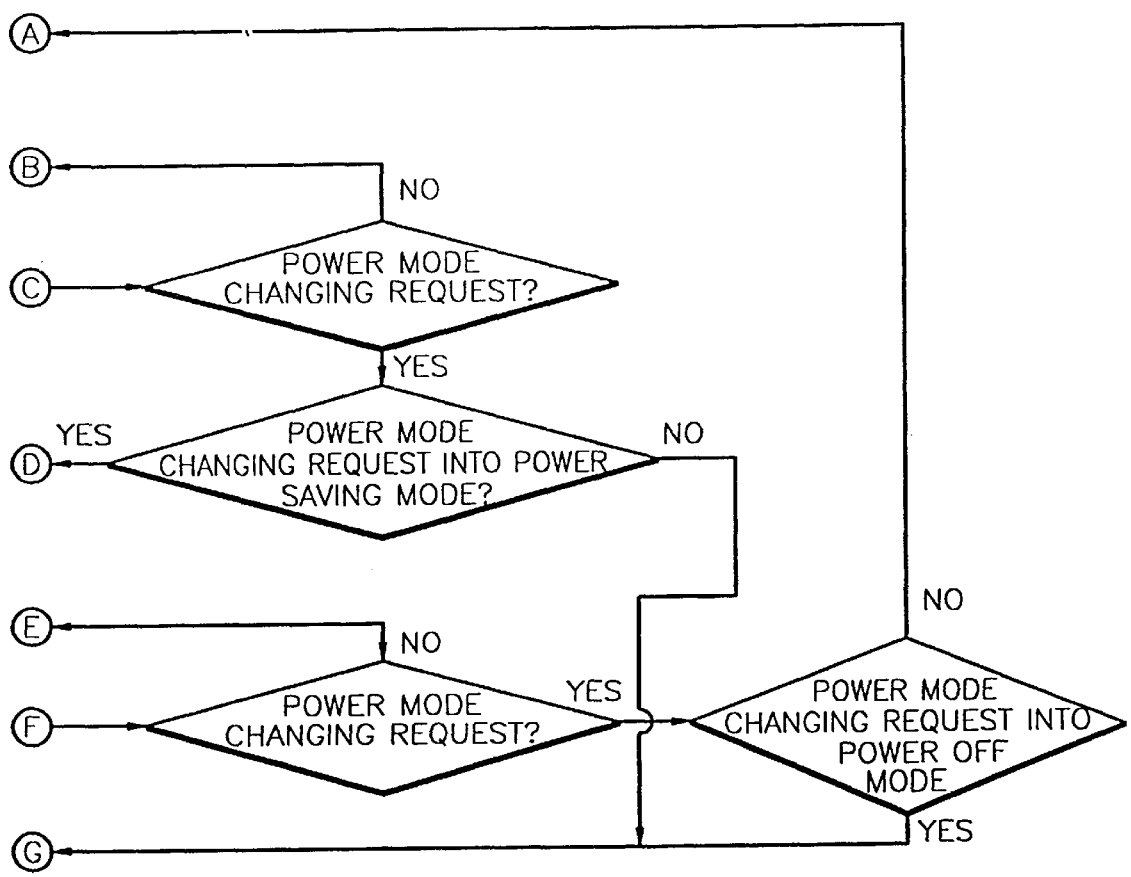

Steps in which the controller 11 decides on a power mode according to whether the power mode set key 12a is pressed and whether print data is received from the user's computer 30 via the communication interface 40 will now be described with reference to FIG. 2.

First, when the power switch 16 is turned on and electric power from the external power source 50 begins to be supplied to the power supply unit 14, the controller 11 initializes the print engine 20 by heating the print engine 20 (step 100), and puts the print engine 20 in the ready-to-print mode in which the print engine 20 is ready to print (step 110). In the following description, it is assumed that a first period of time (x) and a second period of time (y) which are reference periods for the power mode change are set to 30 minutes and 1 hour, respectively.

When the print engine 20 enters into the ready-to-print mode, the controller 11 begins to measure time (step 120). After step 110, if print data is received within 30 minutes from the time of entry into the ready-to-print mode, the controller 11 controls the print engine 20 so that the print engine 20 performs the print job (step 140). When the print job is finished, the controller 11 restores the print engine 20 to the ready-to-print mode and begins to measure time again. When there is a power mode change request according to the operation of the power mode set key 12a by the user while the print engine 20 maintains the ready-to-print mode, the controller 11 changes the mode into a mode selected by the user.

On the other hand, if there is no received print data and no power mode change request by the user for 30 minutes after the ready-to-print mode begins, the controller 11 changes the mode into the power saving mode (step 200).

When the power saving mode begins, the controller begins to measure time (step 210).

If print data is received within 1 hour after the power saving mode begins, the controller 11 changes the mode into the ready-to-print mode (step 110), and controls the print engine 20 so that the print engine performs a print job corresponding to the received print data (step 140). When the print job is finished, the controller 11 restores the print engine 20 to the ready-to-print mode.

In addition, when there is a power mode change request according to the operation of the power mode set key 12a by the user within 1 hour after the power saving mode begins, the controller 11 changes the mode into a mode selected by the user.

On the other hand, if there are no received print data and no power mode -change request by the user within 1 hour after the power saving mode begins, the controller 11 changes the mode into the power off mode (step 300).

In the power off mode, when there is a power mode change request according to the operation of the power mode set key 12a by the user, the controller 11 changes the mode into a mode selected by the user. In addition, when print data is received in the power off mode, the controller 11 changes the mode into the ready-to-print mode and controls the print engine 20 so that the print engine 20 performs the print job.

Figure 3:
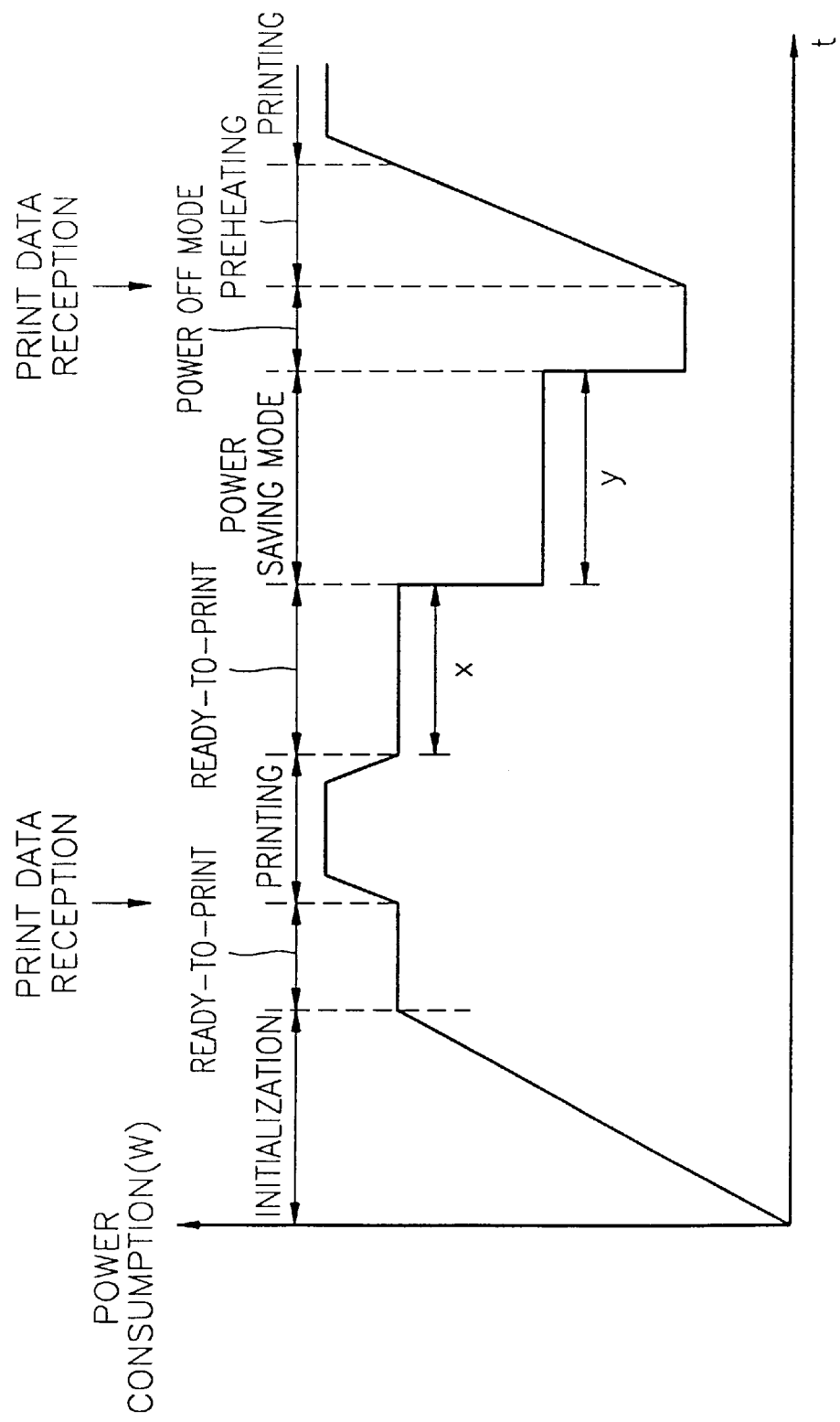
FIG. 3 is a graph illustrating an example of power consumption of a printer according to a power controlling method of the present invention.

An example of the power consumption pattern of a printer according to such a power controlling method is shown in FIG. 3. Reviewing amounts of power consumption according to the respective modes, power consumption is the highest in the printing mode in which printing is performed, and is the lowest in the power off mode. The power consumed in the power saving mode is lower than that in the ready-to-print mode, and is higher than that in the power off mode.

With the above power controlling method, the power consumption can be considerably reduced in a case such as when the user forgets to turn off the power switch 16 and leaves the printer operable for a long time without using it.

According to the above-described printer and power controlling method for the printer according to the present invention, power consumption of the printer can be reduced when the printer is in the on state and is not used for a long time.

What is claimed is:

1. A printer comprising:
   a print engine for printing a toner image;
   a power supply unit for supplying power;
   a power supply controller which receives power from said power supply unit and supplies said received power to said print engine at a power level corresponding to a power mode selected from one of a ready-to-print mode in which said print engine receives power for printing, a power saving mode in which said print engine receives a level of power set below the level of power received by said print engine in said ready-to-print mode, and a power off mode in which power supplied to said print engine is cut off;
   a controller which controls the power mode selection of said power supply controller so that data received by said controller and converted into image data is printed, whereas when print data is not received for a first period of time while in said ready-to-print mode, said controller sends a signal to said power supply controller to operate in said power saving mode, and when print data is not received for a second period of time while in said power saving mode, said controller sends a signal to said power supply controller to operate in said power off mode; and
   an input device having a power mode set key for selecting one of said power modes, wherein said input device supplies a signal to said controller to change the present power mode to said selected power mode.

2. The printer according to claim 1, wherein said controller signals said power supply controller to operate in said ready-to-print mode upon receiving print data.

3. The printer according to claim 1, further comprising a display device which displays information concerning the existing power mode selection, wherein said controller signals said display device to display information concerning the existing power mode selection.

4. A power controlling method for a printer comprising a print engine for printing a toner image, a power supply unit for supplying power, a power supply controller for controlling a power supply level from said power supply unit to said print engine, a controller which controls a power mode selection of said power supply controller so that data received by said controller and converted into image data is printed, an input device having a power mode set key for selecting one of power modes, and a display device which displays information concerning the existing power mode selection, the power controlling method comprising the steps of:

(a) initializing the print engine so that the print engine is ready for printing;

(b) displaying present power mode on said display device;

(c) maintaining a ready-to-print mode in which said controller signals said power supply controller to supply said print engine with power for printing after said initializing step (a) or after a waiting print job is completed;

(d) if print data is not received for a first period of time while said printer is in said ready-to-print mode, changing said ready-to-print mode into a power saving mode in which said print engine is supplied with a level of power set below the level of power supplied to said print engine in said ready-to-print mode;

(e) if print data is not received for a second period of time while said printer is in said power saving mode, changing said power saving mode into a power off mode, in which power supplied to said print engine is cut off;

(f) when print data is receive while said printer is in step (c) or step (d), automatically changing said power saving mode of step (c) or said power off mode of step (d) to said ready-to-print mode; and (g) when a user desires the printer to operate in a specified mode, manually selecting from among said power modes using said power mode set key of said input device.

5. The power controlling method for a printer according to claim 4, wherein said controller signals said power supply controller to operate in said ready-to-print mode, thereby causing said print engine to perform a print job corresponding to the print data.

* * * * *